United States Patent Office 2,854,456
Patented Sept. 30, 1958

2,854,456
NEW GANGLIONIC BLOCKING AGENTS

Renat H. Mizzoni, Chester, N. J., assignor to Ciba Pharmaceutical Products, Inc., Summit, N. J., a corporation of New Jersey No Drawing. Application July 25, 1955
Serial No. 524,270

7 Claims. (Cl. 260—293.4)

This invention relates to a new series of organic compounds. More particularly this invention is concerned with R,R'-diquaternary ammonium compounds of 2-$R_1$-imino-3-$R_2$-4-($R_3$—Z)-4-thiazolines, wherein R, R', $R_1$ and $R_2$ represent lower hydrocarbon radicals, Z stands for a divalent lower hydrocarbon radical separating $R_3$ from the thiazoline ring by at least two carbon atoms, and $R_3$ stands for a tertiary amino group substituted by two lower hydrocarbon radicals or the monovalent radical of a saturated low-membered monocyclic-mono-aza ring being bound to Z by the nitrogen atom; intermediates therefor and methods for their preparation.

The present invention may be more particularly represented by compounds of the following structural formula:

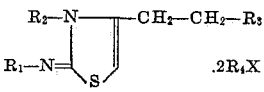

wherein $R_1$, $R_2$ and $R_4$ are lower hydrocarbon radicals such as alkyl radicals, e. g. methyl, ethyl, propyl, butyl or amyl; $R_3$ is a tertiary amino group substituted by two lower hydrocarbon radicals which may be the same or different, as represented by methyl, ethyl, propyl, butyl or amyl; or the monovalent radical of a 5–7 membered saturated monocyclic-mono-aza ring, being bound to the ethylene group by the nitrogen atom such as the pyrrolidino, piperidino, morpholino, thiomorpholino or hexamethylene amino radical; and X is a therapeutically useful anion such as that of the hydrohalic acids, e. g. hydrobromic or hydriodic acid, phosphoric, nitric, oxalic, acetic, citric or tartaric acid; aryl sulfonic, e. g. p-toluene sulfonic; or alkane sulfonic, e. g. methane sulfonic; or alkyl sulfuric acids, or the hydroxyl ion, and advantageously the chlorine anion.

The new compounds of the present invention are useful as medicaments. They are valuable ganglionic blocking agents and may be administered either parenterally or orally, for example in cases of hypertension. They are particularly, and preferably, adaptable for oral administration. The compounds may be formulated in tablets, ampoules or other dosage unit forms. Any suitable carrier or vehicle may be employed for example water, gelatin, starch, magnesium stearate, talc, vegetable oils, benzyl alcohol, gums, polyalkylene glycol, petroleum jelly, cholesterol or other known carriers for therapeutic substances. The dosages employed in actual clinical practice would depend largely on the condition of the patient and the desires of the attending physician. An average single dose appears to be 150–300 mg. orally, and 10–30 mg. intravenously.

Especially valuable in this respect are di-lower alkyl quaternary ammonium compounds of thiazolines of the following formula:

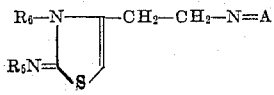

wherein $R_5$ and $R_6$ represent lower alkyl groups such as methyl, ethyl, propyl, butyl or amyl and A, two lower alkyl radicals or a lower alkylene radical such as the pentylene (1,5) or butylene (1,4) radical, for example 2-butylimino - 3 - butyl-4-(β-piperidino-ethyl)-4-thiazoline dimethiodide of the formula

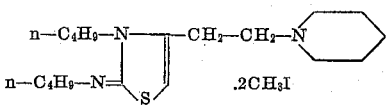

and the 2 - ethylimino - 3-ethyl-4-(β-piperidino-ethyl)-4-thiazoline dimethiodide of the formula:

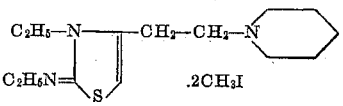

Although a variety of methods may be employed by those skilled in the art for the preparation of the compounds of this invention, I have discovered a particularly useful method and it is intended that this method be included within the scope of the present invention. In accordance with our preferred process, the novel compounds of the invention are prepared by treating a 2-$R_1$-imino-3-$R_2$-4-($R_3$—Z)-4-thiazoline wherein $R_1$, $R_2$, $R_3$ and Z have the above mentioned meaning, or the R-mono-quaternary derivatives thereof, with quaternizing agents capable of introducing lower hydrocarbon radicals, such as reactive esters of lower alkanols e. g. halides, p-toluene sulfonates, alkyl sulfonates etc. to produce the corresponding di-quaternary compounds. The reaction is carried out preferably in the presence of solvents such as lower alkanols, for example methanol or ethanol, or in dimethyl formamide. Although the reaction may be carried out at various temperature ranges, we have found that higher yields are obtained at elevated temperatures, employing, if necessary, a closed vessel.

An alternative process for the preparation of the new compounds being also part of the invention consists in reacting a R-mono-quaternary ammonium compound of a 2-$R_1$-imino-3-$R_2$-4-(E—Z)-4-thiazoline, wherein $R_1$, $R_2$ and Z have the meaning given above and E stands for a reactive esterified hydroxyl group such as a halogen atom or a p-toluene sulfonyloxy group with an amine of the formula $R_3$—R', wherein $R_3$ and R' have the meaning given above, so as to produce the corresponding R, R'-di-quaternary ammonium compound. This reaction is also carried out advantageously in a solvent such as a lower alkanol and at an elevated temperature, if desired in a closed vessel.

Depending on the working conditions, the new compounds are obtained in the form of the free ammonium bases or the salts thereof. The bases can be converted into their salts by reaction with acids. Quaternary salts obtained can be converted into the free ammonium bases by treatment with strong basic agents such as alkali hydroxides or, for example silver oxide. They can also be converted into quaternary salts of other acids appropriate for the formation of therapeutically useful salts by double decomposition. Thus, it is possible, for example, to treat the iodides in alcoholic solution with the silver salt of the desired acid. Alternatively, the iodides may be converted to the chlorides by refluxing with an excess of methanolic hydrogen chloride, the iodide anion being removed as methyl iodide. The conversions can also be effected with the use of anion exchangers.

The non-quaternary starting materials can be obtained by reacting certain ketones of 1,3-disubstituted thioureas in which the substituents in 1 and 3-positions are lower hydrocarbon radicals. The ketones which I prefer to employ are those in which the carbonyl group is bound to the radical X'—Z—, Z comprising the α and β-carbon groups of that ketone and having the meaning ascribed above and X' representing the above-defined radical $R_3$ or a substituent Y convertible thereto, and which ketones have in the α'-position a reactive esterified hydroxyl group such as a halogen atom or a p-toluene sulfonyloxy group and a hydrogen atom. Where the compounds obtained are those having the radical Y, the latter is then converted into $R_3$. The radical Y may be, for example a reactive esterified hydroxyl group such as indicated above which can be converted into $R_3$ by reaction with an amine of the formula $R_3$—H preferably in the presence of an acid-binding agent, such as an excess of the amine. The reaction of the ketone with the thiourea is preferably carried out in an organic solvent such as acetone, methanol or ethanol. Ketones containing the substituent $R_3$ are preferably employed in the form of their salts.

The monoquaternary ammonium compounds mentioned above as starting materials can, for example, be obtained by reacting the corresponding tertiary amine with an agent capable of introducing a lower hydrocarbon radical under mild conditions, such as normal or only slightly elevated temperatures and/or avoiding an excess of quaternizing agents and/or reacting a short period of time and/or using an only moderately active quaternizing agent, so that only the amino group in 4-position is quaternized. Monoquaternary compounds in which the nitrogen atom of the amino group in 4-position is still tertiary can be obtained, for example by treating a corresponding non-quaternary thiazoline having in 4-position the substituent Y—Z with the appropriate quaternizing agent so as to produce a monoquaternary compound and converting Y into $R_3$ as disclosed above.

The invention comprises also the new intermediates disclosed, particularly the $R_1$-imino-3-$R_2$-4-(X'—Z)-thiazolines-(4), wherein $R_1$, $R_2$, X' and Z have the aforementioned meaning, and the salts thereof, as well as the processes for their preparation. It also comprises processes wherein a starting material is formed in the presence of the other reactants.

The invention is described in greater detail in the examples that follow which are presented merely by way of illustration and not of limitation. The temperatures are expressed in degrees centigrade. All parts are by weight unless otherwise indicated.

*Example 1*

15 parts of 2-ethylimino-3-ethyl-4-(β-dimethylaminoethyl)-4-thiazoline hydrobromide is converted to the corresponding base by dissolving in water and making alkaline by addition of sodium hydroxide solution. The product is extracted with ether, the ether is dried over magnesium sulfate, filtered and evaporated. The residue is dissolved in 100 parts by volume of anhydrous ethanol and 13 parts of methyl iodide is used. After refluxing for about 8 hours, the reaction mixture is cooled and ether is added. The crystalline product, 2-ethylimino-3-ethyl-4-(β-dimethylaminoethyl)-4-thiazoline dimethiodide is filtered off. After recrystallization from ethanol, the product melts at 189.5–190° C. The compound has the following structural formula:

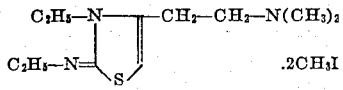

The 2-ethylimino-3-ethyl-4-(β-dimethylaminoethyl)-4-thiazoline hydrobromide employed as the starting material can be obtained as follows:

A mixture of 17.9 parts of 1,3-diethyl-2-thiourea, 37 parts of 1-bromo-4-dimethylamino-2-butanone hydrobromide and 200 parts by volume of anhydrous ethanol is refluxed for three hours. The ethanol is evaporated and ether is added to the residue. The crystalline material is filtered off, washed with ether, then digested with isopropanol, cooled and filtered. After two recrystallizations from ethanol-ether the thus obtained 2-ethylimino-3-ethyl-4-(β-dimethylaminoethyl)-4-thiazoline hydrobromide melts at 198° C.

*Example 2*

15 parts of 2-ethylimino-3-ethyl-4-(β-diethylaminoethyl)-4-thiazoline hydrobromide is converted to the corresponding base by addition of sodium hydroxide to its aqueous solution. The base is isolated by extraction with ether, drying of the solution over sodium sulfate and evaporation. It is dissolved in 100 parts by volume of anhydrous alcohol and 12 parts of methyl iodide is added. After refluxing for about 8 hours, the reaction mixture is cooled and ether is added. The 2-ethylimino-3-ethyl-4-(β-diethylaminoethyl)-4-thiazoline dimethiodide crystallizes out, melting at 177–178° C. (with decomposition). The product has the following structural formula:

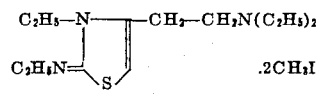

The 2-ethylimino-3-ethyl-4-(β-diethylaminoethyl)-4-thiazoline used as the starting material can be obtained as follows:

A mixture of 24.2 parts of 1,3-diethyl-2-thiourea, 200 parts by volume of ethanol and 56.7 parts of 1-bromo-4-diethylamino-2-butanone hydrobromide are refluxed for about 3 hours, then worked up in the manner described in Example 1. The thus obtained 2-ethylimino-3-ethyl-4-(β-diethylaminoethyl)-4-thiazoline hydrobromide melts at 159–160° C.

*Example 3*

18.6 parts of 2-ethylimino-3-ethyl-4-(β-piperidinoethyl)-4-thiazoline, 24.2 parts of methyl iodide and 100 parts by volume of anhydrous ethanol are refluxed for about 16 hours. After cooling to room temperature, ether is added and the product oils out. The oil is dissolved in hot ethanol and the precipitate formed on cooling is separated. After recrystallization, the thus obtained 2-ethylimino-3-ethyl-4-(β-piperidinoethyl)-4-thiazoline dimethiodide melts at 200–200.5° C. The product has the following structural formula:

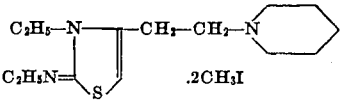

The 2-ethylamino-3-ethyl-4-(β-piperidinoethyl)-4-thiazoline used as starting material can be prepared as follows:

13.2 parts of 1,3-diethyl-2-thiourea, 150 parts by volume of ethanol and 31.5 parts of 1-bromo-4-piperidino-2-butanone hydrobromide are refluxed for about 4 hours. The precipitate is filtered and washed with ether. After recrystallization from ethanol-ether, 2-ethylimino-3-ethyl-4-(β-piperidinoethyl)-4-thiazoline hydrobromide is obtained, melting at 212° C.

*Example 4*

12.8 parts of 2-butylimino-3-butyl-4-(β-diethylaminoethyl)-4-thiazoline, 9.2 parts of methyl iodide and 200 parts by volume of anhydrous ethanol are refluxed for about 4 hours. The oily product which is obtained on addition of ether is dissolved in hot isopropanol and the precipitation formed on cooling is separated. After crystallization from isopropanol, the product 2-butylimino-3-butyl-4-(β-diethylaminoethyl)-4-thiazoline dimethiodide, melting at 156–157° C. is obtained. The compound has the following structural formula:

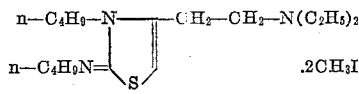

The 2 - butylimino - 3-butyl-4-(β-diethylaminoethyl)-4-thiazoline used as the starting material can be prepared as follows:

10.3 parts of 1,3-di-n-butyl-2-thiourea, 17 parts of 1-bromo-4-diethylamino-2-butanone hydrobromide and 50 parts by volume of anhydrous ethanol are refluxed for about 3.5 hours. Upon addition of ether, the product oils out. The oily material is converted to the corresponding base, 2-butylimino-3-butyl-4-(β-diethylaminoethyl)-4-thiazoline, by alkalization of its aqueous solution, extraction with ether, and evaporation of the dried ethereal solution to dryness.

*Example 5*

10.3 parts of 2 - butylimino - 3-butyl-4-(β-piperidinoethyl)-4-thiazoline, 19.6 parts of methyl iodide and 100 parts by volume of anhydrous ethanol are refluxed for about 5 hours. The crystalline product which appears after evaporation of half of the ethanol is filtered, washed with ether and triturated with hot isopropanol. After recrystallization from ethanol-ether, the product 2-butylimino - 3 - butyl - 4-(β-piperidinoethyl)-4-thiazoline dimethiodide, melting at 206–211° C. is obtained. The product has has following structural formula:

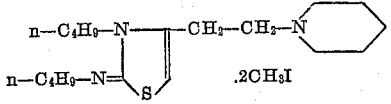

The 2-butylimino-3-butyl-4-(β-piperidinoethyl)-4-thiazoline used as starting material can be prepared as follows:

18.8 parts of 1,3-di-n-butyl-2-thiourea, 31.5 parts of 1-bromo-4-piperidino-2-butanone hydrobromide and 200 parts by volume of anhydrous ethanol are refluxed for about 3 hours. After evaporating off half of the ethanol, the product crystallizes and is filtered and washed with ether. The thus obtained 2-butylimino-3-butyl-4-(β-piperidinoethyl)-4-thiazoline dihydrobromide after recrystallization from ethanol water melts at 201.5–203° C. It is converted into its base by alkalization of its aqueous solution, extraction with ether and evaporation of the dried ethereal solution to dryness.

What is claimed is:

1. 2 - ethylimino - 3-ethyl-4-(β-dimethylaminoethyl)-4-thiazoline dimethiodide.
2. 2 - ethylimino - 3 - ethyl-4-(β-diethylaminoethyl)-4-thiazoline dimethiodide.
3. 2 - ethylimino - 3-ethyl-4-(β-piperidinoethyl)-4-thiazoline dimethiodide.
4. 2 - butylimino - 3 - butyl-4-(β-diethylaminoethyl)-4-thiazoline dimethiodide.
5. 2 - butylimino - 3 - butyl-4-(β-piperidino-ethyl)-4-thiazoline dimethiodide.
6. Di-lower alkyl quaternary ammonium compounds of 2-$R_1$-imino-3-$R_2$-4-($\beta R_3$-ethyl)-4-thiazolines in which $R_1$ and $R_2$ are lower alkyl radicals, and $R_3$ represents a di-lower alkylamino group.
7. R,R'-diquaternary ammonium compounds of 2-$R_1$-imino-3-$R_2$-4-($R_3$—Z)-4-thiazolines, wherein R, R', $R_1$ and $R_2$ represent lower alkyl radicals, Z stands for a divalent lower alkyl radical, separating $R_3$ from the thiazoline ring by at least two carbon atoms, and $R_3$ stands for a member of the group consisting of di-lower alkylamino and piperidino radicals.

References Cited in the file of this patent
UNITED STATES PATENTS

| | | |
|---|---|---|
| 2,626,949 | Gregory | Jan. 27, 1953 |
| 2,636,037 | Sprague et al. | Apr. 21, 1953 |
| 2,751,392 | Grogan | June 19, 1956 |